United States Patent [19]
Van Cleave

[11] Patent Number: 4,864,613
[45] Date of Patent: Sep. 5, 1989

[54] BROADBAND CONVERTER/DESCRAMBLER INTERFACE FOR CABLE TV

[75] Inventor: James Van Cleave, Doylestown, Pa.

[73] Assignee: General Instrument Corporation, New York, N.Y.

[21] Appl. No.: 217,049

[22] Filed: Jul. 8, 1988

Related U.S. Application Data

[63] Continuation of Ser. No. 928,463, Nov. 10, 1986, abandoned.

[51] Int. Cl.⁴ ............................................. H04N 7/167
[52] U.S. Cl. ...................................... 380/10; 380/13; 380/15; 455/190
[58] Field of Search .......................... 380/10, 13, 15; 455/176, 180, 190

[56] References Cited

U.S. PATENT DOCUMENTS

| | | | |
|---|---|---|---|
| 3,639,686 | 2/1972 | Walker et al. ...................... 325/466 |
| 4,238,766 | 12/1980 | Masuda ................................. 358/86 |
| 4,266,243 | 5/1981 | Shutterly ............................. 358/121 |
| 4,272,791 | 6/1981 | Rifken .................................. 380/13 |
| 4,295,223 | 10/1981 | Shutterly ............................. 455/72 |
| 4,316,217 | 2/1982 | Rifken .................................. 358/86 |
| 4,318,125 | 3/1982 | Shutterly ............................. 358/121 |
| 4,322,745 | 3/1982 | Saeki et al. ........................... 380/10 |
| 4,335,404 | 6/1982 | Martinson, Jr. ..................... 358/188 |
| 4,353,088 | 10/1982 | den Toonder et al. ............. 358/120 |
| 4,496,986 | 1/1985 | Lubchenko et al. ................ 358/114 |
| 4,518,993 | 5/1985 | Okada et al. ........................ 455/180 |
| 4,530,008 | 7/1985 | McVoy ................................. 380/13 |
| 4,555,730 | 11/1985 | Briggs .................................. 358/142 |
| 4,608,456 | 8/1986 | Paik et al. ........................... 179/1.5 S |
| 4,611,242 | 9/1986 | Williams ............................. 358/123 |
| 4,630,133 | 12/1986 | Long ..................................... 358/335 |
| 4,644,580 | 2/1987 | Akabane ............................... 381/4 |
| 4,656,629 | 4/1987 | Kondoh et al. ...................... 370/85 |
| 4,679,085 | 7/1987 | Johnson et al. ..................... 358/160 |
| 4,682,360 | 7/1987 | Frederiksen ......................... 380/10 |
| 4,691,234 | 9/1987 | Albean ................................. 358/144 |
| 4,710,814 | 12/1987 | Gassmann et al. .................. 358/143 |

Primary Examiner—Stephen C. Buczinski
Attorney, Agent, or Firm—Barry R. Lipsitz

[57] ABSTRACT

A broadband converter/descrambler intended for use with cable-ready video appliances (e.g., a VCR or television) receives signals from a cable TV drop. The cable TV signals are characterized by a plurality of scrambled and unscrambled TV channels. The scrambled channels are received, descrambled and reinserted in an unused portion of the TV spectrum, enabling the converter/descrambler to provide output signals on a plurality of different signal channels to which the video appliance can be tuned.

15 Claims, 3 Drawing Sheets

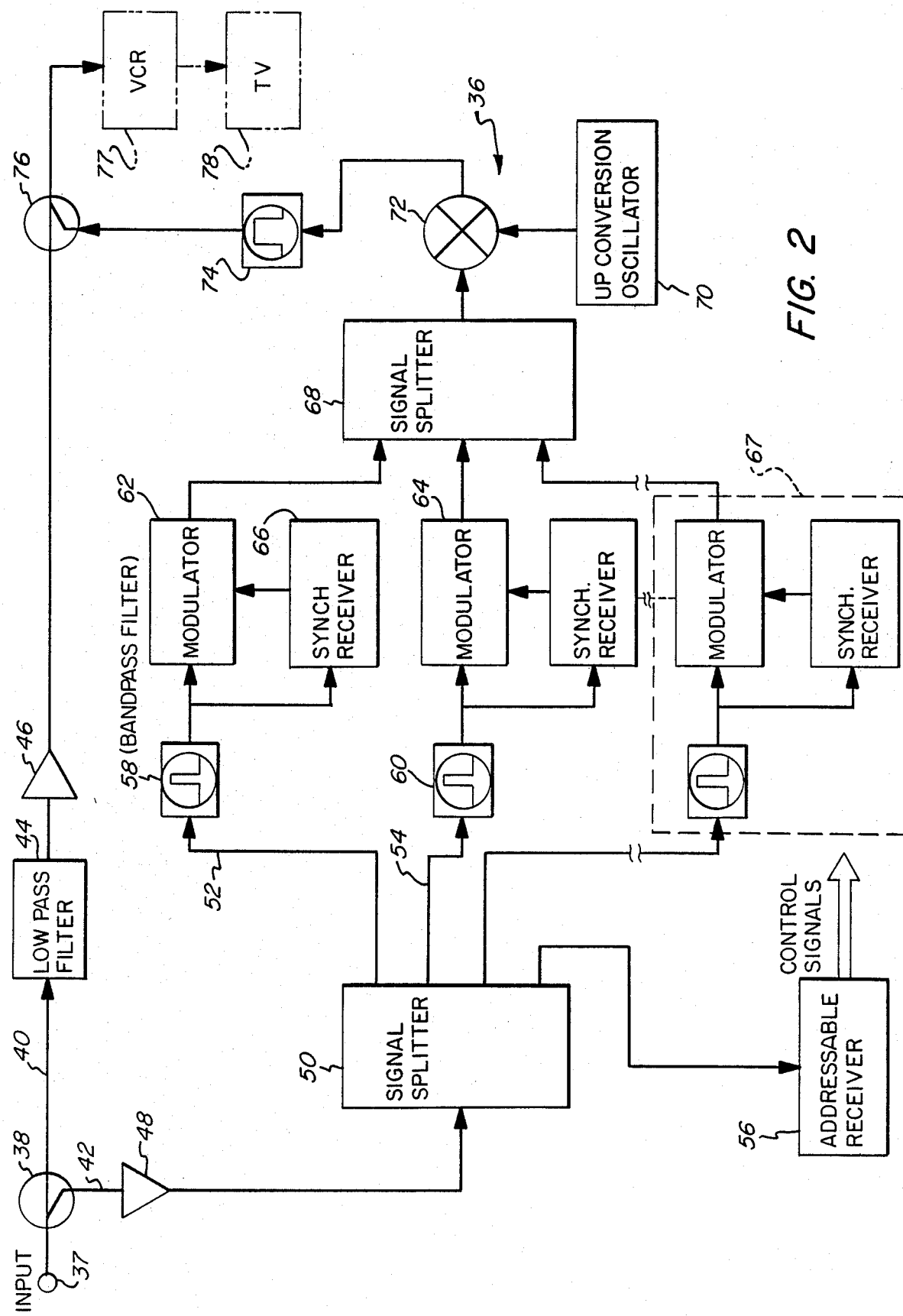

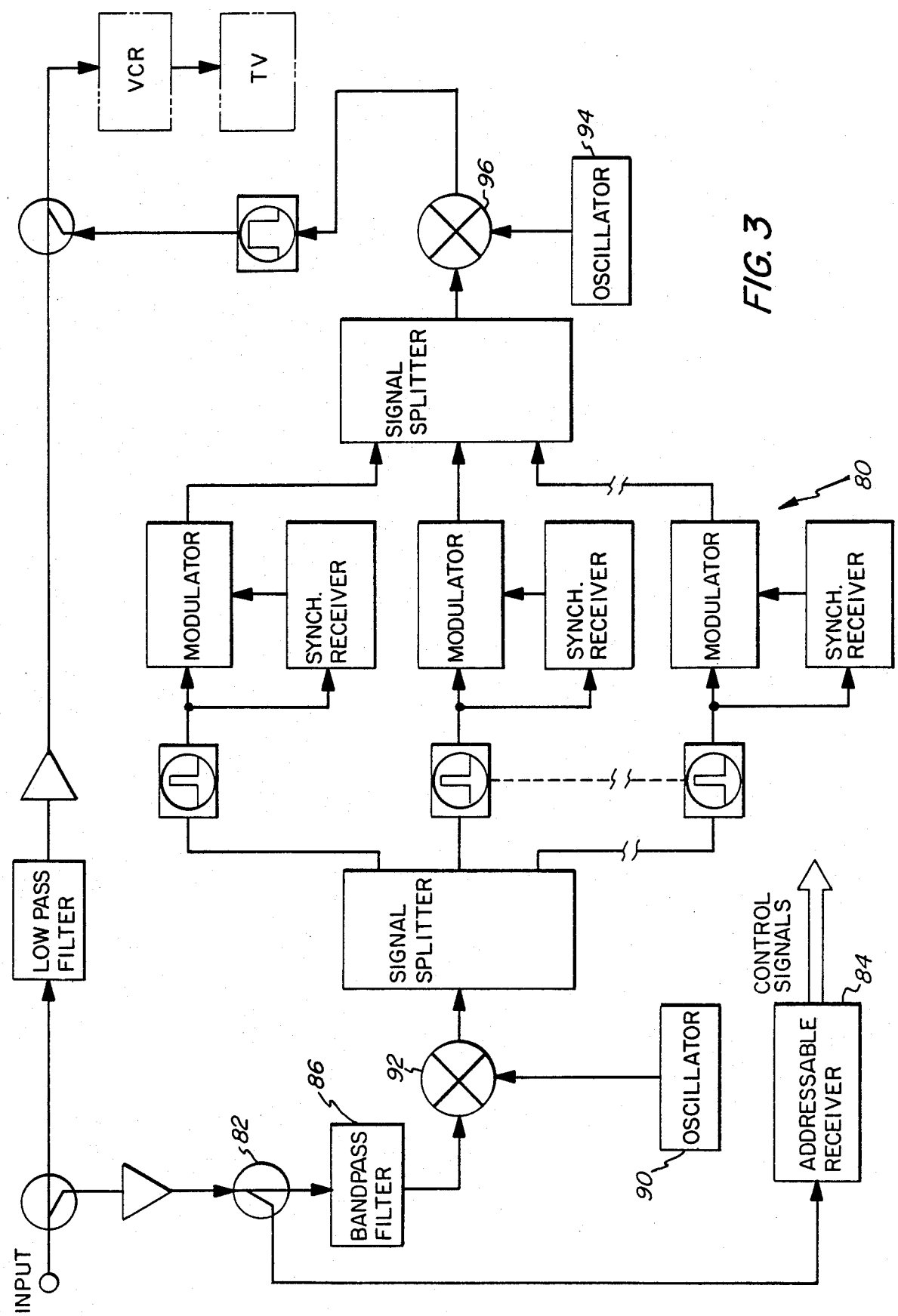

BROADBAND CONVERTER/DESCRAMBLER INTERFACE FOR CABLE TV

This application is a continuation of application Ser. No. 928,463, filed Nov. 10, 1986, now abandoned.

TECHNICAL FIELD

This invention relates to descrambling devices receiving incoming TV signals and more particularly, to converter/descrambling devices which receive multi-channel TV signals from a cable TV drop and which provide unscrambled multi-channel output signals compatible with cable-ready televisions, video cassette recorders (VCR's), and the like.

BACKGROUND OF THE INVENTION

With the rise of subscription TV services, a number of systems have been developed which will scramble the outgoing TV signals so that only those subscribers having an extra cost descrambler will be able to view programs on that channel. The prior art contains a number of devices which will descramble the incoming TV signals. Tese converter/descramblers typically receive a multi-channel input signal from a cable TV drop having both scrambled and unscrambled channels. Some or all of the scrambled channels are descrambled, depending upon what channels the subscriber is authorized to receive. All of the TV signals are output from the converter/descrambler on a single channel, typically channel 2, 3 or 4.

In order for the subscriber to view any cable television programs, he must tune his TV to the channel on which the converter/descrambler outputs the television signals (e.g., channel 2, 3 or 4). The subscriber's television set is left on this channel, and program channel selection is accomplished by using the tuner which is built into the cable TV converter/descrambler.

The use of a conventional converter/descrambler requires the additional expense of a tuner supplemental to the one already present in the subscriber's TV. Further, the single channel output nature of a conventional converter/descrambler is notoriously user unfriendly. Interfacing with other subscriber video equipment, such as a VCR, is quite complicated and can be exasperating to the subscriber. An outline of the problem can be found in commonly owned U.S. patent application no. 877,349 entitled "A VCR Interface for Receiving Cable TV Signals", now abandoned.

Initially, TV sets were equipped with a tuner receiving a limited number of cable TV channels. However, modern cable-ready TV sets and VCR units are now equipped with a tuner which can receive upwards of 70 channels, far exceeding the number of signal channels actually available to the subscriber. Some cable TV systems provide less than 20 channels. A typical system has 30-35 channels. Very few have in excess of 50 channels, although systems are available which have as many as 77 channels. Even though cable-ready television sets can tune in all of the channels a cable system offers, they cannot descramble premium channels. Thus, each TV set must be equipped by the cable system operator with a separate descrambler to provide viewing of premium programming. Most conventional converter/descramblers do not enable the utilization of many features provided in a cable-ready television set (e.g., remote volume control, audio muting, favorite channel programming, picture-in-a-picture, etc.), since the TV must always remain tuned to the output channel of the converter/descrambler. As a result, a subscriber must keep track of and use two separate remote control units to control both the TV and the converter/descrambler.

The single channel output of prior art converter/descramblers was mandated in part because it is not practical, and is often impossible, to remove a scrambled channel or channels from a contiguous set of channels, descramble the channel and reinsert it in unscrambled form back into the same channel assignment from whence it came. This is primarily due to the extremely stringent filtering requirements of TV signals. It is not presently possible to economically filter TV signals such that a first channel is totally separate from its adjacent channels without distorting the removed or remaining channels, or both.

It would be advantageous to provide an economical system for removing premium (i.e., scrambled) channels from a cable television signal, descramble those channels which a subscriber is authorized to view, and reinsert the channels in descrambled form back into the cable signal which is input to the subscriber's television set (or other video appliance). In this manner, the subscriber could view all unscrambled and authorized scrambled channels transmitted via the cable system without the need to use a separate tuner provided by the cable service provider. The subscriber could use the tuner in his cable-ready video appliance to tune to all channels directly, including the premium channels he is authorized to receive.

The present invention provides such a system.

SUMMARY OF THE INVENTION

An object of the present invention is to provide a broadband converter/descrambler interface for receiving cable TV signals, descrambling premium program signals on selected signal channels, and providing a multiple channel output signal to a video appliance (e.g., TV or VCR) wherein all channels authorized for viewing are descrambled. The channels contained in the multiple channel output signal can all be tuned directly using the tuner of a cable-ready video appliance.

According to the present invention, an apparatus coupled to receive TV signals on a signal channel band having a plurality of scrambled and unscrambled signal channels and defined by upper and lower signal channels, includes a signal divider coupled to receive the TV signals for providing first and second divided signals, each having the scrambled and unscrambled signal channels. A low pass filter is coupled to receive the first divided signal, and provides only scrambled and unscrambled signal channels below the upper signal channel. Converter/descrambler means are coupled to receive the second divided signal, descramble at least one of the scrambled signal channels, and convert each of the descrambled signal channels into a corresponding signal channel above the upper signal channel. A combiner is coupled to receive the output signals from the converter/descrambler and combines the signal channels from the low pass filter with the upshifted descrambled signal channels from the converter/descrambler.

According to another aspect of the present invention, a broadband synchronization suppression converter/descrambler apparatus is coupled to receive a multichannel TV signal on a signal channel defined by upper and lower signal channels. The multichannel TV signal has a plurality of scrambled and unscrambled signal channels, each scrambled signal channel having an initial ratio between the synchronization and video signal amplitudes before scrambling. The apparatus includes a signal divider coupled to receive the multichannel TV signal for providing first and second divided signals, each of the first and second divided signals having the scrambled and unscrambled signal channels. A low pass filter is coupled to receive the first divided signals and provides only those scrambled and unscrambled signal channels that are below the upper signal channel of the signal channel band. A signal splitter is coupled to receive the second divided signals and outputs them on a plurality of outputs. Bandpass filters are coupled to receive the outputs from the signal splitter, and limit each output to a frequency band defined by the particular bandpass filter. A separate descrambler is coupled to receive the band-limited signal from each of the bandpass filters and returns the synchronization and video signal amplitudes to the initial ratio therebetween to effect descrambling. A signal combiner means is coupled to receive and combine the descrambled signals from all of the descramblers. A signal mixer means, having a conversion oscillator means as one input thereto, is coupled to receive the combined signals and converts the descrambled signals to corresponding signal channels above the upper signal channel of the TV signal channel band. A second bandpass filter is coupled to receive the mixer output signal and passes only those signals on channels within a signal band selected to be above the upper signal channel of the TV signal channel band. A second signal combiner is coupled to receive signals from both the second bandpass filter means and the low pass filter and combines them to provide a composite signal to a video appliance. The composite signal includes all of the original channels from the low pass filter together with the frequency converted unscrambled signals from the descramblers.

BRIEF DESCRIPTION OF THE DRAWINGS

FIG. 2 is a detailed block diagram of a synchronization suppression broadband converter/descrambler provided according to the present invention; and FIG. 3 is an alternative embodiment of the broadband converter/descrambler of FIG. 2.

DETAILED DESCRIPTION OF THE PREFERRED EMBODIMENT

Figure 1:
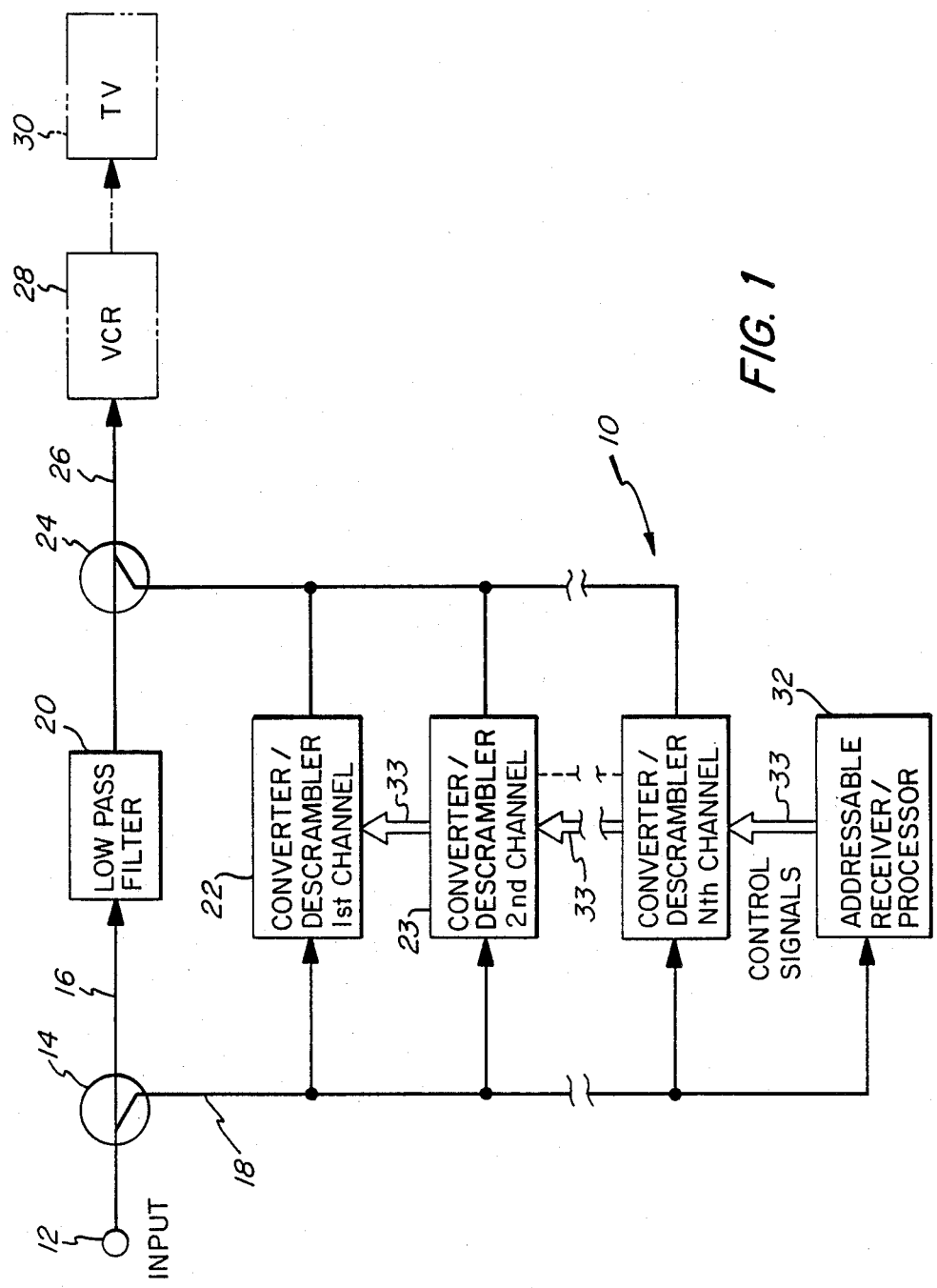
FIG. 1 is a simplified block diagram illustrating a broadband converter/descrambler provided according to the present invention.

Referring now to FIG. 1, there is illustrated a simplified block diagram of a broadband converter/descrambler provided according to the present invention. A broadband converter/descrambler 10 receives signals typically from a cable TV drop 12. The TV signals are characterized by a signal channel band having upper and lower signal channels (e.g., channel 2 at 50 MHz and channel 50 at 400 MHz). Cable TV signals usually include a plurality of unscrambled signal channels as well as scrambled "premium" signal channels. The scrambled signal channels cannot be viewed without proper descrambling.

The TV signals input to the present apparatus are received by a signal divider 14 which outputs a first divided signal on line 16 and second divided signal on line 18. The divider is a conventional type signal splitter. Low pass filter 20 receives the first divided signal. The low pass filter itself is conventional and passes only those signal channels, scrambled or unscrambled, which are below a certain frequency. In a typical cable TV system, signal channels 2 through 50 may be provided. These channels are contained within the range of 50-400 MHz. Therefore, the low pass filter will be selected to pass only those signals below the highest signal channel (e.g., channel 50 at 400 MHz) on the incoming signal channel band.

The second divided signal is provided to a converter/descrambler for descrambling at least one of the scrambled signal channels. In the preferred embodiment, a plurality of converter/descramblers (e.g., 22, 23) are provided, each corresponding to one of the signal channels which is to be descrambled. Those skilled in the art will note that although a plurality of discrete converter/descramblers are described herein, a single block converter/descrambler may be substituted. However, a known disadvantage of block converter/descramblers is the ease in which the scrambling can be defeated.

The converter/descramblers also provide means for upshifting the descrambled signal channels onto a corresponding signal channel above the highest signal channel provided in the incoming cable signal. In the case where the highest channel in the cable signal is channel 50 at 400 MHz, the descrambled signal channels are upshifted to channels above 400 MHz, such as channels 53, 55, etc. These higher channels are capable of being tuned by cable-ready video appliances, and reside in the space above 400 MHz which has previously been unused and therefore, wasted by cable television systems. Since these channels are available and are otherwise wasted, the present system can afford to be sloppy and spread a few descrambled channels out among a larger number of available channel slots. Thus, instead of using consecutive channels above the highest channel in the cable system, it is advantageous to place the descrambled premium signals on every other or every third high-end channel, e.g., channels 53, 55, 57, etc.

These upshifted, descrambled signal channels are output to a signal combiner 24 which receives the low pass filter signal channels as well, presenting a composite broadband descrambled TV signal on line 26 to be received by the subscriber's home video equipment, typically a VCR 28 or television set 30. The subscriber's cable-ready video equipment can tune to all of the original channels on the cable drop as well as the descrambled premium channels which have been upshifted to higher channels.

Also present in FIG. 1 is addressable receiver/processor 32 which receives the first divided signal on line 34. The addressable receiver/processor is responsive to command signals embedded by the cable system operator in the broadband cable signal and, when addressed by the signal source, the addressable receiver/processor will be programmed to enable descrambling of authorized channels by applying control signals 33 to the appropriate converter/descramblers.

Referring now to FIG. 2, there is illustrated a detailed schematic block diagram of a broadband synchronization suppression converter/descrambler 36 provided according to the present invention. One of the more common scrambling techniques involves suppression of the horizontal synchronization component of the video signal. Scrambling of the video portion of the TV signal can be accomplished by simple suppression by a select amount, typically 6 db, of the horizontal synchronization pulse carried in each video line. Other "dynamic" synchronization suppression techniques involve varying, in time, the amount of suppression of the synchronization signal component, i.e., 0 db/6 db/10 db. Such scrambling techniques are well known in the art.

The synchronization suppressed broadband converter/descrambler 36 receives TV signals at input 37 on a signal channel band defined by an upper and lower signal channel. The signal channel band has a plurality of scrambled and unscrambled signal channels with the scrambling accomplished by the synchronization suppression technique detailed above. Each scrambled signal channel has an initial ratio between the synchronization pulse and video signal amplitudes before scrambling. The TV signals are received and presented to divider 38 which divides the signals into a first and second divided signal providing these signals on lines 40 and 42, respectively. The first divided signal is provided to a low pass filter 44 which passes only those signals below a certain frequency, typically below 400 MHz (channel 50). These low pass filter signals are amplified by amplifier 46 which is of a conventional type and may be optional, depending on the application. The purpose of amplifier 46 is to match the strength of the signal from low pass filter 44 to that of the signal from filter 74 (described below) as both signals enter a combiner 76.

The second divided signals are received by a second amplifier 48 similar in design and purpose to amplifier 46. The amplified second divided signals are provided to signal splitter 50 which splits the received signals into a plurality of identical signals, each provided on a corresponding output line of which lines 52 and 54 are examples. The amplified second divided signal is also provided to addressable receiver/processor 56, which is conventional, and operates in the same manner as the receiver/processor described hereinabove with respect to FIG. 1.

Each of the output signals from splitter 50 is provided to a corresponding conventional bandpass filter such as bandpass filters 58 and 60 to limit the signal to a particular channel for subsequent descrambling. Each bandpass filter is designed to provide adequate flatness to the channel for which it is tuned while attenuating each third adjacent channel by approximately 55 db. Adjacent channels are attenuated somewhat, but need not be fully suppressed. By spacing scrambled channels within the broadband cable signal into intervals of at least every third channel (i.e., no scrambled channel has another scrambled channel within two channels thereof), sufficient tuning and isolation of channels to be descrambled can be achieved in an economical manner using low-cost filters. Spacing in intervals greater than every third channel is also feasible, allowing a corresponding reduction in signal filtering requirements. Conversely, spacing at alternate channels significantly increases filter complexity and cost but is also possible.

The bandpass filter signals are provided to modulators such as modulators 62 and 64. Each modulator is normally a programmable attenuator, usually using PIN diodes, that attenuate the time domain TV signal by a prescribed amount, such as 6 db. However, the synchronization pulse itself is not attenuated. As a result, the synchronization pulse is upward modulated by approximately 6 db for 6 db suppression systems which removes the synchronization scrambling. Corresponding programmable modulators can be substituted to handle other types of suppression schemes, such as the 0 db/6 db/10 db dynamic scrambling method described above.

The synchronization pulses to drive the modulators are derived from a synchronization receiver such as synchronization receiver 66, that is a conventional AM detector tuned to a specific synchronization carrier signal frequency (e.g., the sound carrier) for each channel in the FIG. 2 embodiment. It is possible to provide a separate synchronization receiver for each modulator. Equivalently, only one synchronization receiver with multiple phased outputs may be used, but require phased synchronization scrambling at the cable system head-end.

Each channel bandpass filter (58, 60, etc.) synchronization receiver (66) and modulator (62) can be packaged into a plug-in module (designated by dashed-line box 67) which can be physically installed or removed according to the particular services to which a cable television customer subscribes. It is also feasible to provide a separate, usually FM/FSK receiver, tuned to a preset command frequency that allows remote addressing of each channel descrambler with all of the channel descrambling circuitry being preset, whether remotely authorized or not.

The modulated descrambled signal channels output from the modulators 62 are provided to a second signal splitter 68 which is used as a signal combiner to combine all of the descrambled channels together. The descrambled signal channels are then mixed by a mixer 72 with the output of an oscillator 70 to up-convert the descrambled channels to higher channel frequencies. A conventional bandpass filter 74 receives the descrambled, upshifted signals and removes undesired mixer output, spurious or feedthrough signals.

Combiner 76 receives both the amplified first divided signals and the descrambled upshifted signals, combines them, and provides on lines 74 broadband basic and descrambled premium TV signals for input to a subscriber's consumer video equipment such as VCR 77 and TV 78.

FIG. 3 illustrates an alternative embodiment 80 to the broadband converter/descrambler of FIG. 2, which allows a plurality of scrambled channels with channel assignments being less restricted and allowing adjacent, scrambled channels to be descrambled and reapplied to the cable signal. The alternative embodiment is characterized by an additional signal divider 82 (which provides signals to addressable receiver 84), an additional bandpass filter 86, and additional oscillator 90 and mixer 92. Bandpass filter 86 receives signals from signal divider 82 and passes the band of frequencies that contains scrambled premium channels. Oscillator 90 and mixer 92 convert the TV signal channels from bandpass filter 86 to an intermediate frequency either above or below the existing cable television band. If the intermediate frequency is below 54 MHz, conventional lumped constant IF filters can be used to tune specific channels for descrambling. If the intermediate frequency is above 250 MHz or so, SAW IF filters become attractive. By converting to a convenient intermediate frequency outside of the standard cable TV band, distortion from adjacent channels is reduced. Thus, cheaper and more practical bandpass filter implementations can be used to select channels for descrambling.

The remaining apparatus of FIG. 3 is similar to that described hereinabove with respect to FIG. 2. Oscillator 94 drives mixer 96 to upshift descrambled signal channels, allowing the descrambled signal channels to be reinserted above the highest TV signal channel present in the cable system.

Similarly, although the invention has been described with respect to a best mode embodiment thereof, those skilled in the art will note that certain additions, deletions, or substitutions thereto can be made consistent with the spirit and scope of the invention.

I claim:

1. Converter/descrambler apparatus for a cable ready video appliance, said video appliance having means for tuning and viewing non-premium nonscrambled and premium descrambled TV signals within and above a signal channel band, said signal channel band being defined by upper and lower signal channels and having a plurality of said scrambled signal channels and a multiplicity of said nonscrambled signal channels, said converter/descrambler apparatus comprising:

an input adapted to receive said TV signals at least within said signal channel band;

signal divider means coupled to receive the TV signals from said input for providing first and second divided signals, each having the scrambled and nonscrambled signal channels;

a plurality of descrambler means coupled to receive said second divided signal for simultaneously descrambling a plurality of said scrambled signal channels;

a plurality of converter means, coupled respectively to said plurality of descrambler means, for simultaneously up-converting each signal channel descrambled by said plurality of descrambler means to a different signal channel above said upper signal channel, each of said converter means being consistently tuned to a respective one of said scrambled signal channels, and each of the scrambled signal channels consistently corresponding one-to-one with each of the up-converted, descrambled signal channels; and signal combiner means coupled to receive the up-converted, descrambled signal channels and said first divided signal for producing a composite broadband signal which simultaneously contains the signal channels of said first divided signal together with the plurality of up-converted descrambled signal channels for input to said cable-ready video appliance.

2. The apparatus of claim 1 further comprising low pass filter means coupled in series with said first divided signal for providing said signal combiner means with only the signal channels contained in the first divided signal which are at or below the upper signal channel.

3. The apparatus of claim 1 further comprising a plurality of bandpass filter means coupled to receive said second divided signal and coupled respectively to said plurality of descrambler means, for passing a different filtered signal to each of said plurality of descrambler means within a different signal band, each of said signal bands corresponding to one of said scrambled signal channels.

4. The apparatus of claim 3 wherein each of said filters attenuates by at least 50 db another channel offset from the passed channel by two intervening channels and attenuates by less than 50 db the intervening channel adjacent to the passed channel.

5. The apparatus of claim 1 wherein said descrambled signal channels are up-converted such that they are spaced from each other by at least one unused signal channel.

6. The apparatus of claim 1 further comprising addressable receiver/processor means for selectively enabling said plurality of descrambler means to descramble specific scrambled signal channels of said second divided signal which are authorized for viewing.

7. The apparatus of claim 1 further comprising second converter means coupled to receive said second divided signal for converting said second divided signal to an intermediate frequency out of the TV signal channel band prior to descrambling.

8. A method of providing signals from a cable TV drop to a cable ready video appliance comprising:

receiving from a cable TV drop TV signals in a first range of channels, said TV signals including both nonscrambled and scrambled channels;

splitting the TV signals into two signal paths, a first signal path and a second signal path;

unscrambling in the second signal path the scrambled channels;

up-converting in the second signal path the unscrambled channels to a second range of channels above the first range of channels;

combining the unscrambled, up-converted signals in the second range of channels in the second signal path with the signals in the first range of channels in the first signal path; and providing the first range of channels and the second range of channels along a single transmission path to a cable ready video appliance.

9. The method of claim 8 further comprising:

providing a low pass filter in the first signal path, said low pass filter passing only those signal channels in the first range of channels.

10. The method of claim 8 wherein the scrambled channels are unscrambled and up-converted to regularly-spaced, nonadjacent channels in the second range of channels.

11. The method of claim 8 wherein:

a plurality of scrambled channels are received in the first range of channels; and the scrambled channels are unscrambled and up-converted to every third channel in the second range of channels.

12. The method of claim 8 further comprising:

converting the signals in the second signal path to an intermediate frequency which is either above or below the first range of channels prior to said unscrambling step.

13. In combination with a method of providing signals from a cable TV drop to a cable ready video appliance according to claim 8, a method of transmitting said signals in the first range of channels to the cable drop comprising:

providing two or more scrambled channels within the first range of signals on nonadjacent channels.

14. A method of transmitting signals according to claim 13 wherein the two or more scrambled channels are provided on regularly-spaced, nonadjacent channels.

15. A method of transmitting signals according to claim 14 wherein the two or more scrambled signals are provided on every third channel in the first range of channels.

* * * * *